(12) United States Patent
Dobson, Jr. et al.

(10) Patent No.: US 11,713,414 B1
(45) Date of Patent: Aug. 1, 2023

(54) POLYACRYLAMIDE DRAG REDUCER COMPOSITIONS

(71) Applicant: TUCC Technology, LLC, Houston, TX (US)

(72) Inventors: James W. Dobson, Jr., Houston, TX (US); Rickey L. Warmack, Houston, TX (US)

(73) Assignee: TUCC Technology, LLC, Houston, TX (US)

( * ) Notice: Subject to any disclaimer, the term of this patent is extended or adjusted under 35 U.S.C. 154(b) by 0 days.

(21) Appl. No.: 17/446,067

(22) Filed: Aug. 26, 2021

Related U.S. Application Data

(60) Provisional application No. 63/071,215, filed on Aug. 27, 2020.

(51) Int. Cl.
  *C09K 8/64* (2006.01)
  *C09K 8/70* (2006.01)

(52) U.S. Cl.
  CPC .............. *C09K 8/70* (2013.01); *C09K 8/64* (2013.01); *C09K 2208/28* (2013.01)

(58) Field of Classification Search
  CPC ......... C09K 8/70; C09K 8/64; C09K 2208/28
  See application file for complete search history.

(56) References Cited

U.S. PATENT DOCUMENTS

| | | | |
|---|---|---|---|
| 2003/0181532 A1* | 9/2003 | Parris ...................... | C09K 8/58 516/20 |
| 2012/0048554 A1* | 3/2012 | Hughes ................... | C09K 8/70 166/305.1 |
| 2012/0329685 A1* | 12/2012 | Huang .................... | C09K 8/506 507/245 |
| 2017/0313930 A1* | 11/2017 | Patel ....................... | C09K 8/882 |

OTHER PUBLICATIONS

Claims 1-7 are rejected under 35 U.S.C. 102(a)(1) as being anticipated by Li (J. Li, et al., Morphology and rheological properties of polyacrylamide/ bentonite organic crosslinking gel, Energies, 2019, 12, 3648).*
Li (J. Li, et al., Morphology and rheological properties of polyacrylamide/ bentonite organic crosslinking gel, Energies, 2019, 12, 3648).*
McDonald, B. et al., "Completion Optimization in the Fayetteville Shale Utilizing Rate Transient Analysis for Candidate Selection," Society of Petroleum Engineers, SPE-179160-MS, 2016, 7 pages.
Motiee, Monet, et al., "High Concentration Polyacrylamide-Based Friction Reducer Used as a Direct Substitute for Guar-Based Borate Crosslinked Fluid in Fracturing Operations," Society of Petroleum Engineers, SPE-179154-MS, 2016, 11 pages.
Sanders, Michael, PhD, et al., "Dry Polyacrylamide Friction Reducer: Not Just for Slick Water," Society of Petroleum Engineers, SPE-179146-MS, 2016, 13 pages.
Shah, S., et al., "Methodology for Evaluating Drag Reduction Characteristics of Friction Reducer," Society of Petroleum Engineers, SPE-189537-MS, 2018, 18 pages.
Xiong, Boya, et al., "Polyacrylamide Degradation and its Implications in Environmental Systems," Nature.com, NPJ Clean Water, Sep. 7, 2018, 9 pages.

\* cited by examiner

*Primary Examiner* — Kumar R Bhushan
(74) *Attorney, Agent, or Firm* — Lewis & Reese, PLLC

(57) ABSTRACT

Polyacrylamide (PAM) compositions and methods of using the compositions as drag reducers in well treatment fluids are disclosed. The compositions use PAM particles with log-asymmetric particle size distributions. For example, about 10% or more of the PAM particles may have particle sizes above 76 μm, but the particle size distribution tails toward lower particles sizes. Dry PAM formulations and premixed concentrate compositions are disclosed. Well treating fluids prepared using the disclosed compositions reach maximum drag reduction very quickly and also exhibit high sustained drag reduction.

19 Claims, 3 Drawing Sheets

POLYACRYLAMIDE DRAG REDUCER COMPOSITIONS

CROSS REFERENCE TO RELATED APPLICATIONS

This is a non-provisional application of U.S. Provisional Patent Application Ser. No. 63/071,215, filed Aug. 27, 2020, to which priority is claimed, and which is incorporated by reference.

FIELD OF THE INVENTION

This application relates to well treatment fluids, and more specifically to polyacrylamide drag reducer compositions.

INTRODUCTION

Many subterranean, hydrocarbon-containing and/or producing reservoirs require one or more stimulation operations, such as hydraulic fracturing. Hydraulic fracturing involves injecting fluid into a formation via the wellbore under high pressure to create fractures in the rock and/or to increase the size, extent, and connectivity of existing fractures. The hydraulic fracturing fluid may be water and it typically includes other chemicals and components. For example, the fracturing fluid typically conveys a proppant material, such as sand, which infiltrates the fractures formed in the formation and is deposited in the fractures to prop the fractures open so that they do not simply close back up once the high pressure fracturing fluid is removed. The fracturing fluid may include additional components to increase its ability to transport the proppant material. For example, the fracturing fluid may include viscous polymer gel systems, such as guar, that increase the ability of fracturing fluid to suspend and carry the proppant material. Other chemicals, such as crosslinkers, may be added to increase the viscosity of the gel to enhance its proppant-carrying ability. Also, gel breaking chemicals may be added to cause the gel to break down under certain time, pressure, and/or temperature conditions, for example, to enhance the deposition of the proppant in the formation and to modulate the power needed to pump the fracturing fluid over time as the fracturing operation evolves. Various gel-based fracturing fluid systems have been developed over the past several decades.

Another type of fracturing fluid system uses high fluid velocity, rather than high viscosity to carry proppant. These fracturing fluids typically include drag reducing additives (a.k.a. friction reducing agents) to promote laminar flow to reduce friction pressure in the pumping systems and to allow pumping rates that are adequate for suspending usable amounts of proppant materials. Drag reducer fracturing systems have several advantages over the more traditional, gel-based systems. For example, they can generally tolerate a wider range of impurities in the water used to prepare the fracturing fluid. Also, they can use less powerful equipment than is required to pump the more viscous gel-based systems.

While drag reducer-based fracturing systems may offer improvements over the traditional gel-based systems, the inventor has recognized a need in the art for further improving such drag reducer-based systems. Specifically, there is a need for systems that reach their maximum drag reducing capability quickly and that sustain their drag reducing capability over time.

SUMMARY

Disclosed herein are concentrate compositions for preparing a fracturing fluid, the concentrate compositions comprising: an organic fluid, a suspension agent, and polyacrylamide (PAM) particles having a log-asymmetric particle size distribution, wherein the specific surface area of the particle size distribution is 35 m2/kg or greater. According to some embodiments, the specific surface area of the particle size distribution is 100 m2/kg or greater. According to some embodiments, at least 0.5% of the particles have a particle size less than 11 μm. According to some embodiments, at least 3% of the particles have a particle size less than 11 μm. According to some embodiments, at least 5% of the particles have a particle size less than 21 μm. According to some embodiments, at least 10% of the particles have a particle size less than 21 μm. According to some embodiments, at 40-65% of the particles are in a particle size range of 76-211 μm. According to some embodiments, the PAM particles comprise PAM having a molecular weight of 10,000,000 to 30,000,000 Da. According to some embodiments, the PAM particles comprise anionic PAM. According to some embodiments, the organic fluid is a low aromatic mineral oil. According to some embodiments, the suspension agent is an organophilic clay. According to some embodiments, the concentrate composition further comprises a polar activator. According to some embodiments, the polar activator is propylene carbonate. According to some embodiments, the concentrate composition further comprises one or more surfactants. According to some embodiments, the one or more surfactants comprise anionic surfactants. According to some embodiments, the one or more surfactants comprise dodecylbenzene sulfonate. According to some embodiments, the concentrate composition comprises 2-6 pounds of the PAM particles per gallon of concentrate composition.

Also disclosed herein are dry compositions for preparing a fracturing fluid, the compositions comprising: polyacrylamide (PAM) particles having a log-asymmetric particle size distribution, wherein the specific surface area of the particle size distribution is 35 m2/kg or greater. According to some embodiments, the specific surface area of the particle size distribution is 100 m2/kg or greater. According to some embodiments, at least 0.5% of the particles have a particle size less than 11 μm. According to some embodiments, at least 3% of the particles have a particle size less than 11 μm. According to some embodiments, at least 5% of the particles have a particle size less than 21 μm. According to some embodiments, at least 10% of the particles have a particle size less than 21 μm. According to some embodiments, 40-65% of the particles are in a particle size range of 76-211 μm. According to some embodiments, the PAM particles comprise PAM having a molecular weight of 10,000,000 to 30,000,000 Da. According to some embodiments, the PAM particles comprise anionic PAM.

Also disclosed herein are methods of forming a well treatment fluid by blending an aqueous base fluid with any of the concentrate composition described above. According to some embodiments, the concentration of PAM in the well treatment fluid may be about 0.1 to about 35 pounds of PAM per 1,000 gallons of the well treatment fluid. The amount of PAM in the well treatment fluid may depend on the particular application. For example, to provide drag reduction the concentration of PAM may be about 0.1 to about 8 pounds of PAM per 1,000 gallons of the well treatment fluid. If the purpose is to build viscosity in the treating fluid, then more PAM may be used, for example, about 8 to about 35 pounds of PAM per 1,000 gallons of the well treatment fluid.

Also disclosed herein are methods of forming a well treating fluid by blending an aqueous base fluid with any of the dry composition described above. Well treatment fluids made in such manner are also disclosed. According to some embodiments, the well treating fluid comprises 0.1 to 35 pounds of PAM per thousand gallons of well treating fluid.

DETAILED DESCRIPTION

Figure 1:
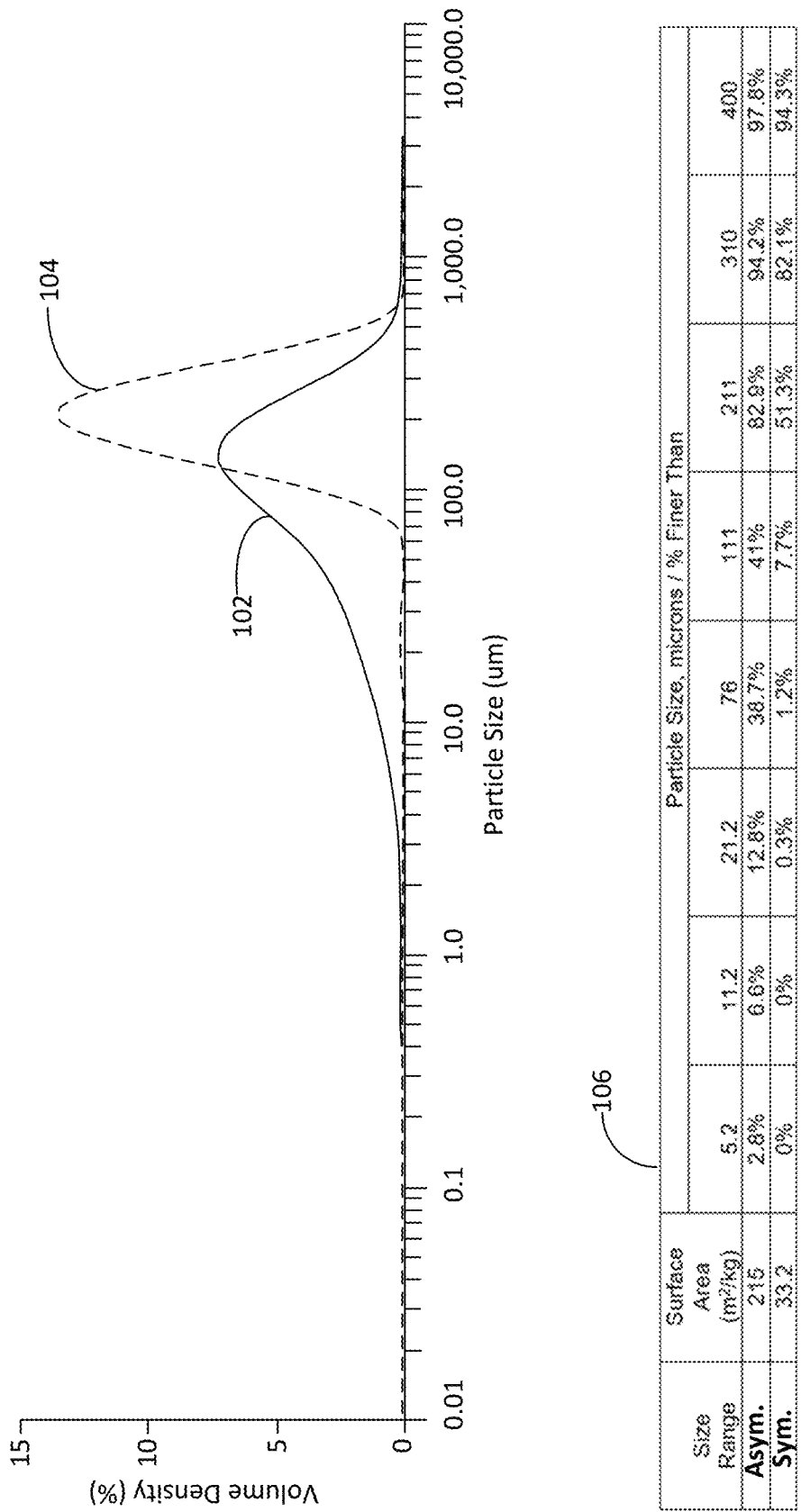
FIG. 1 shows lognormal and log-asymmetric polyacrylamide (PAM) particle size distributions.

As mentioned above, this disclosure concerns drag reducer-based treatment fluids, such as fracturing fluids. The treatment fluids comprise a polymer, such as polyacrylamide (PAM) as a drag reducing agent (a.k.a. friction reducing agent). The treatment fluid may be formed by mixing dry PAM particles with a suitable base fluid or solvent. Thus, the disclosure provides compositions of dry PAM particles (with ideal particle size distributions, as described below), methods of making treating fluids by mixing the PAM particles with a suitable base fluid, and methods of using the treating fluids for treating a formation.

The disclosure also provides concentrate compositions comprising PAM particles (with ideal particle size distributions, as described below). The concentrate compositions can be mixed with a suitable base fluid to form a treating fluid. The concentrate compositions typically include an organic fluid, such as a low aromatic hydrocarbon fluid, as well as suspension agents, surfactants, polar activators, and the like. Each of the components of the disclosed concentrate compositions are described in more detail below. Methods of preparing the concentrate compositions, using the concentrate compositions to prepare a treating fluid, and using the treating fluid to treat a formation are also described.

The well treatment fluids may be prepared at a job site by mixing either the disclosed dry PAM materials and other treatment fluid components into a suitable base fluid or by mixing the disclosed concentrate compositions into a suitable base fluid. In certain embodiments of the present disclosure, the preparation of these well treatment fluids of the present invention may be done at the job site in a method characterized as being performed "on the fly." The term "on-the-fly" as used herein is meant to include methods of combining two or more components wherein a flowing stream of one element is continuously introduced into a flowing stream of another component so that the streams are combined and mixed while continuing to flow as a single stream as part of the on-going treatment. Such mixing can also, and equivalently, be described as "real-time" mixing.

The Applicant notes that drag reducer-based treatment fluids incorporating a PAM drag reducer have been described in the prior art. For example, U.S. Patent Publication 2017/0313930 ("the '930 Publication") describes PAM-based treating fluids and oil-based PAM compositions for mixing with a base fluid to form PAM-based treating fluids. The oil-based slurries comprise PAM suspended in an oil-based vehicle with the aid of a suspension agent and a surfactant. The surfactant is an ethoxylated nonionic emulsifier. The surfactant can be a fatty chain EO/PO (ethylene oxide propylene oxide) and/or oxylated propoxy copolymer. The suspension aid is any variation of diblock copolymers based on styrene and ethylene/propylene. The composition may also contain organophilic clay or a synthetic alternative as the suspension agent. The '930 Publication uses PAM particles that range in size from 200 mesh (74 µm) to 75 mesh (210 µm). The '930 Publication states that decreasing the particle size of the PAM powder enhances the hydration and inversion rate of the PAM and provides better overall drag reduction.

The inventors of the instant disclosure, however, have realized that the relationship between the particle size distribution of the PAM particles and the properties of the drag reducing fracturing fluid is more complicated than suggested in the '930 Publication. Simply reducing the particle size is not the best approach to obtaining the optimum drag reduction. Using dry PAM compositions with very fine particles to formulate a well treatment fluid is not optimum, because when the particles are made too fine, the particles tend to agglomerate. The agglomeration effectively reduces the surface area of the particles, which reduces the activity of the PAM when it is mixed into the treating fluid. The efficiency of the drag reduction is reduced. Because the particle sizes are effectively increased due to agglomeration, the time to reach maximum drag reduction may be increased, the magnitude of the maximum drag reduction may be decreased, and the sustained drag reduction may be decreased. Also, simply using very fine particles to formulate concentrated compositions is not optimal because concentrated suspensions made with very fine particles may have too high a viscosity to be workable.

The inventors have discovered that the optimum particle size distribution of PAM particles, both for use in dry formulations for directly forming a treating fluid, and for formulating concentrate suspensions, is a particle size distribution such that, when the particle size is plotted on a logarithmic axis, the plot is asymmetric, i.e., it is not lognormal. Specifically, the plot is negatively skewed, i.e., skewed toward smaller particle sizes. Such particle size distributions are referred to herein as log-asymmetric particle size distributions. Note that particle size refers to diameter, as may be determined by laser diffraction. According to some embodiments, the determined particle size distributions are volume weighted distributions.

FIG. 1 illustrates a log-asymmetric particle size distribution 102 (solid line) as used in the disclosed PAM compositions. FIG. 1 also shows a lognormal particle size distribution 104 (dashed line) as disclosed in the '930 Publication. Note that the axis is expressed in logarithmic scale. The illustrated table 106 provides details of the particle sizes of the two distributions, as determined by laser diffraction. The illustrated log-asymmetric distribution 102 has a smaller particle size peak (~130 µm) than the lognormal distribution 104 (~200 µm). Importantly, the log-asymmetric particles size distribution is asymmetric about the particle size peak (i.e., the mode of the distribution, when plotted on a logarithmic axis). According to some embodiments, the PAM particle distribution logarithmic plots are negatively skewed (or left skewed), meaning that they include a tail at the small particle end of the distribution and include a significant number of smaller particles. As shown in the table, in the log-asymmetric particle size distribution 102, 2.8% of the particles are smaller than 5.2 µm, 6.6 of the particles as smaller than 11.2 µm, and 12.8% of the particles as smaller than 21.2 µm. By contrast, the lognormal particle size distribution 104 contains essentially no particles below 21.2 µm. Notice also, that the specific surface area (determined based on the particle size distribution) of the log-asymmetric particle size distribution is 215 m²/kg, whereas the specific surface area of the symmetrical particle size distribution is only 33.2 m²/kg.

Figure 2:
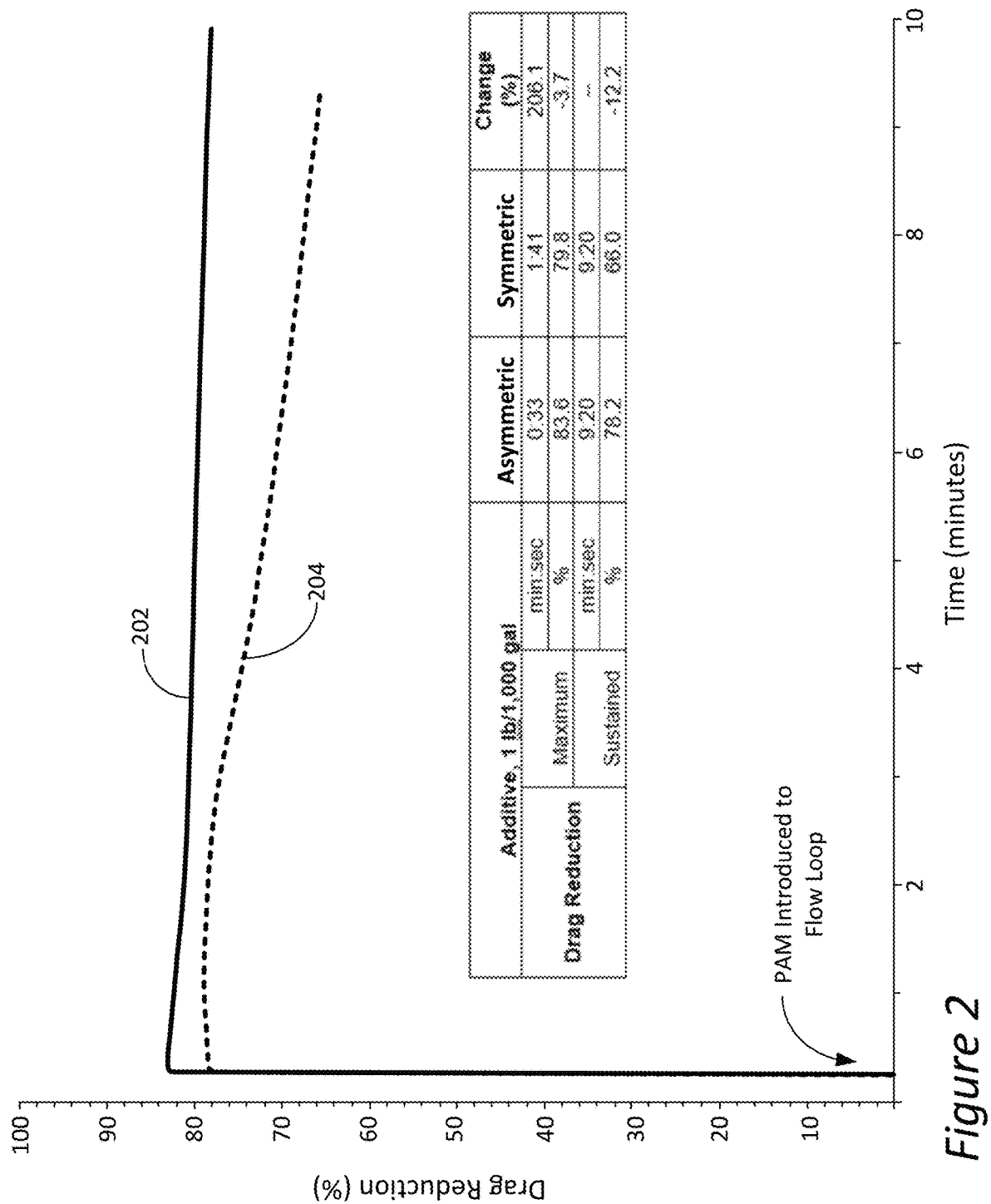
FIG. 2 shows a comparison of drag reduction characteristics of lognormal and log-asymmetric PAM particle size distributions.

FIG. 2 illustrates the drag reduction behavior of fluids made using the log-asymmetric PAM particles size distribution (102, FIG. 1) compared to the drag reduction behavior of fluids made using the symmetric PAM particle size distribution (104, FIG. 1). Drag reduction was measured using a recirculating flow loop, as is known in the art. See, e.g., "Methodology for Evaluating Drag Reduction Characteristics of Friction Reducer," S. Shah, et al., SPE-189537-MS, 2018. The flow loop used in these measurements had a 12-foot straight pipe with 4-foot entrance and exit made of 0.5-inch tubing. The fluids in both samples had a total dissolved solids (TDS) value of 10,000 mg/L. The average temperature was about 27.7 C and the pump rate was 14.2 gallons per minute. That flow rate generates a Reynolds number of 100,000 to 150,000. The samples were dispersed in 250 mL of the brine and sheared at 1000 rpm for 75 seconds before introducing them into an 8-gallon reservoir and immediately circulating them.

Trace 202 (solid line) shows the drag reduction provided by a 1 pound per 1,000 gal treating fluid prepared using the log-asymmetric PAM particles size distribution (102, FIG. 1). Trace 204 (dotted line) shows the drag reduction provided by a 1 pound per 1,000 gal treating fluid prepared using the lognormal PAM particles size distribution (104, FIG. 1). When PAM having the log-asymmetric particle size distribution is introduced into the flow loop, the treating fluid reaches its maximum drag reduction (83.6% drag reduction) at a time of 0:33 (minutes:seconds). When PAM having the lognormal particle size distribution is introduced into the flow loop, the treating fluid reaches its maximum drag reduction (78.2% drag reduction) at a time of 1:41 (minutes:seconds). The treating fluid using the log-asymmetric particle size distribution provides greater maximum drag reduction and also reaches the maximum drag reduction much quicker (206.1% faster in the illustrated example) compared to the treating fluid using the symmetric particle size distribution. Moreover, log-asymmetric particle size distribution provides better sustained drag reduction than the symmetric particle size distribution, as measured at 9:20 (minutes:seconds) (78.2% for the log-asymmetric compared to 66.0% for the symmetric).

The inventors have discovered that the specific surface area of the particles in the particle size distribution is a good predictor of the drag reducing effectiveness of treating fluids made using the PAM particles. The specific surface area of a particle distribution is a function of the sizes of the particles in the distribution; the specific surface area increases with decreasing particle size. However, the specific surface area is a function of other properties of the particles in addition to just their sizes. Such properties include the porosity of the particles, the pore size distribution, the shape of the particles, and the roughness of the particles, for example. Each of these aspects may influence the dissolution rate of the particles, and consequently the drag reducing behavior of compositions comprising the particles. The inventors have determined that, according to some embodiments, selecting particle distributions on the basis of the specific surface area of the distribution is better than simply decreasing the particle size. As mentioned above, using ever-decreasing particle sizes can be problematic. According to some embodiments, the specific surface area may be determined based on light scatter (i.e., laser diffraction). According to some embodiments, the specific surface area may be determined using adsorption of gas molecules onto the PAM material, for example, using the Brunauer-Emmett-Teller (BET) method, known in the art.

Figure 3:
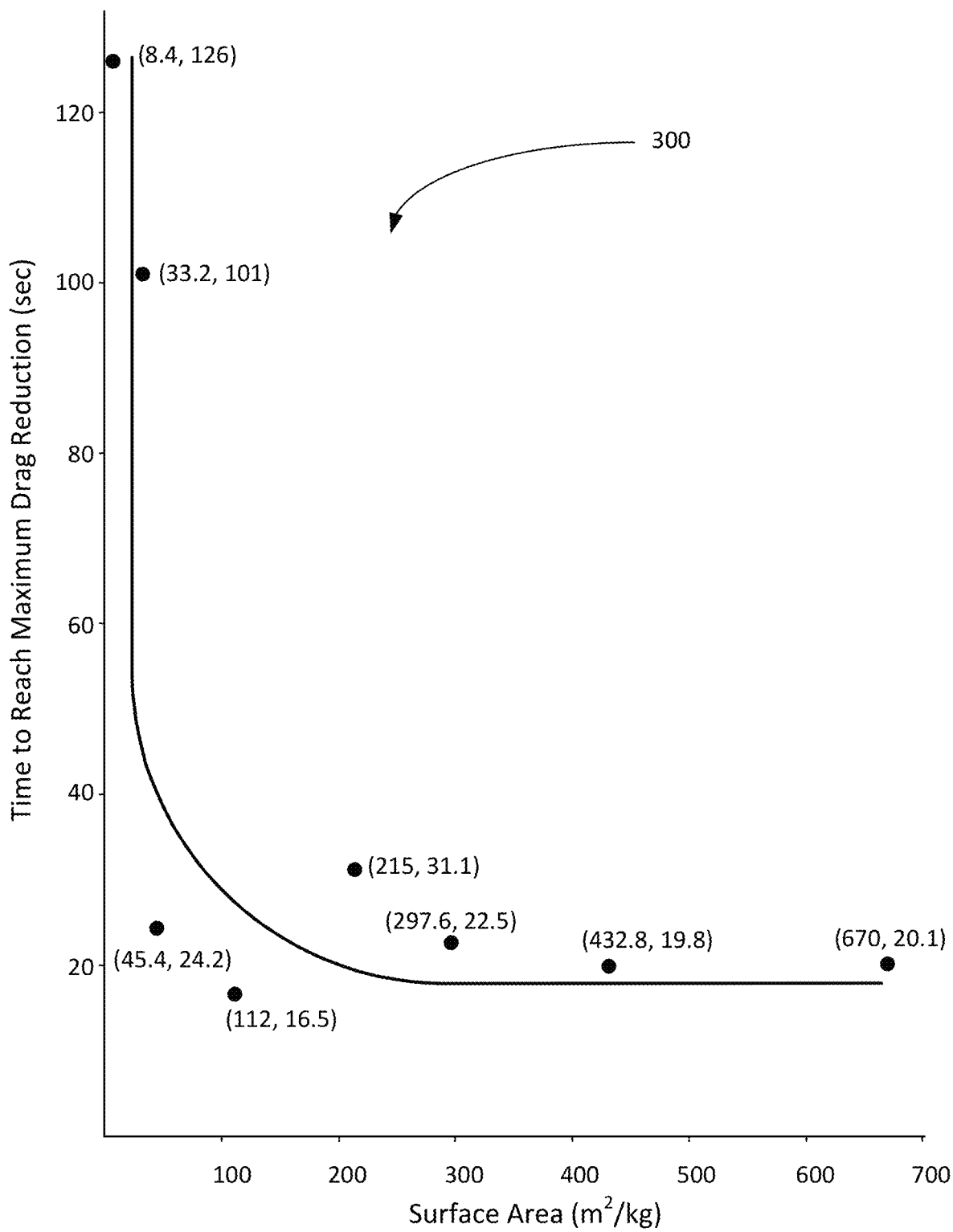
FIG. 3 shows time to reach maximum drag reduction using PAM-based treating fluids as a function of the specific surface area of the PAM particles.

FIG. 3 shows a plot 300 of the time to reach maximum drag reduction as a function of the specific surface area of the particles for various particle size distributions of PAM particles. Notice that treating fluids using PAM particles with a size distribution with a specific surface area of 45.4 m²/kg or greater obtain maximum drag reduction much faster than those with distributions with smaller surface areas. For example, the fluid with a particle size distribution having a surface area of 45.4 m²/kg reaches a maximum drag reduction in 24.2 seconds, whereas the fluid with a particle size distribution having a surface area of 33.2 m²/kg does not reach maximum drag reduction until 101 seconds.

Accordingly, some embodiments of the compositions described herein comprise PAM particles with size distributions that have a surface area greater than about 35 m²/kg. For example, the surface area may be about 35 m²/kg to about 700 m²/kg. More typically, the distributions have a surface area of at least 50 m²/kg, at least 100 m²/kg, at least 200 m²/kg, or at least 400 200 m²/kg. According to some embodiments, the compositions described herein comprise PAM particles with size distributions that have at least 0.5%, or at least 3.0%, or at least 5.0% of the particles less than 11 μm. According to some embodiments, the PAM compositions have PAM particles size distributions wherein at least 5%, or at least 10% of the particles are less than 21 μm. According to some embodiments, at least 15%, or at least 20% of the particles are less than 75 μm.

Note that the distribution may also include a significant number of larger particles, for example, particles having sizes greater than 76 μm. According to some embodiments, 10% of the particles in the distribution may have sizes greater than 76 μm. According to some embodiments, 15%, or 20%, or 25%, or 30%, or 35%, or 40% of the particles in the distribution may have sizes greater than 76 μm. For example, about 50% of the particles may have sizes between 76 and 211 μm. According to some embodiments, 40% to 65% of the particles are in the range of 76 and 211 μm. According to some embodiments, 50% to 60% of the particles are in the range of 76 and 211 μm.

As described above, embodiments of the PAM compositions have particle size distributions that include a significant number of smaller particles, which tends to increase the specific surface area of the particle size distribution. Embodiments of the compositions also contain larger particles, for example with a significant number of particles having sizes greater than 76 μm. According to some embodiments, the distributions may be unimodal, even though the distributions contain both smaller and larger particles. According to some embodiments the distributions may be bimodal or multi-modal.

The PAM particles having log-asymmetric size distributions, as described herein, may be produced by grinding/milling coarse PAM particles. Various grinding techniques may be used, including roller milling, ball milling, hammer milling, jet milling, and impact milling. According to some embodiments, impact milling with air classification can be used to obtain PAM particles having the disclosed log-asymmetric particle size distributions. As is known to those of skill in the art of grinding, the parameters of the impact mill/air classifier system can be controlled to provide the desired particle size distribution. Such parameters include the material feed rate, the impact rotor speed, the separator wheel speed, and the air flow.

The PAM materials used in the disclosed compositions may be anionic, cationic, or nonionic. Generally, cationic PAM materials are more expensive but sometimes are required in systems with high total dissolved solids (TDS). However, the inventor has determined that less expensive anionic PAM materials with the disclosed particle size distributions provide good results even in high TDS systems. The PAM materials may be low, medium, or high molecular weight. According to some embodiments, the PAM materials may be one or more of standard weight materials (6 to 10 million Da), high molecular weight materials (10 to 15 million Da), or very high molecular weight materials (greater than 15 million Da). For example, the PAM particles may have molecular weights of 10,000,000 to 30,000,000 Da, according to some embodiments.

The treating fluids described herein are generally aqueous-based treating fluids and comprise water or a water-based brine as a base fluid. The water utilized as a solvent or base fluid for preparing the well treatment fluid compositions described herein can be fresh water, unsaturated salt water, including brines, seawater, and saturated salt water. Other water sources may be used, including those comprising monovalent, divalent, or trivalent cations (e.g., magnesium, calcium, zinc, or iron) and, where used, may be of any weight.

In certain exemplary embodiments, the aqueous base fluid may comprise fresh water or saltwater depending upon the particular density of the composition required. The term "salt water" as used herein may include unsaturated salt water or saturated salt water "brine systems" that are made up of at least one water-soluble salt of a multivalent metal, including single salt systems such as a NaCl, NaBr, $MgCl_2$, KBr, or KCl brines, as well as heavy brines (brines having a density from about 8 ppg to about 20 ppg), including but not limited to single-salt systems, such as brines comprising water and $CaCl_2$, $CaBr_2$, zinc salts including, but not limited to, zinc chloride, zinc bromide, zinc iodide, zinc sulfate, and mixtures thereof, with zinc chloride and zinc bromide being preferred due to low cost and ready availability; and, multiple salt systems, such as $NaCl/CaCl_2$ brines, $CaCl_2/CaBr_2$ brines, $CaBr_2/ZnBr_2$ brines, and $CaCl_2/CaBr_2/ZnBr_2$ brines. If heavy brines are used, such heavy brines may have densities ranging from about 12 ppg to about 19.5 ppg (inclusive), and more preferably, such a heavy brine will have a density ranging from about 16 ppg to about 19.5 ppg, inclusive.

The well treatment fluid may be prepared by adding dry PAM (having the disclosed particle size distributions) to the base treating fluid, in a hydration unit, for example to provide an appropriate concentration of the PAM in the well treatment fluid. According to some embodiments, the concentration of PAM in the well treatment fluid may be about 0.1 to about 35 pounds of PAM per 1,000 gallons of the well treatment fluid. The amount of PAM in the well treatment fluid may depend on the particular application. For example, to provide drag reduction the concentration of PAM may be about 0.1 to about 8 pounds of PAM per 1,000 gallons of the well treatment fluid. If the purpose is to build viscosity in the treating fluid, then more PAM may be used, for example, about 8 to about 35 pounds of PAM per 1,000 gallons of the well treatment fluid. Other chemicals, such as biocides, scale inhibitors, suspending/rheological agents such as polyurea-based rheology control agents including the BYK agents, such as BYK-8720 described below, etc. Proppant may then be blended with the well treatment fluid. The treatment fluid may then be pressurized and pumped into the wellbore via a wellhead to effect wellbore treatment.

The disclosed PAM compositions may also be provided as a premixed PAM concentrate, which may be mixed with the base treating fluid to provide a well treatment fluid. Using the premixed PAM concentrates may increase the efficiency of the hydration process. The disclosed premixed PAM concentrate comprises PAM (having the disclosed particle size distributions) suspended in the concentrate. The amount of PAM in the concentrate may be about 2 pounds to about 6 pounds of PAM particles per gallon of concentrate, for example. According to some embodiments, the premixed PAM concentrates may comprise about 25% to about 65% PAM (having the disclosed particle size distributions).

The PAM premixed concentrates comprise a carrier fluid, which may typically be an organic fluid. Examples of suitable organic fluids include substances such as diesel oil, mineral oil (including low aromatic content mineral oils), synthetic oil such as polyolefins or isomerized polyolefins, ester oils, glycerides of fatty acids, aliphatic esters, aliphatic ethers, aliphatic acetals, or other such hydrocarbons and combinations of these. According to some embodiments, the organic fluid is a low aromatic mineral oil (i.e., containing less than about 1% aromatics). According to some embodiments, the organic fluid is present in the PAM premixed concentrate in an amount of about 3 to about 6 pounds of organic fluid per gallon of premixed concentrate. According to some embodiments, the premixed concentrate comprises about 30% to about 70% organic fluid.

The premixed PAM concentrates disclosed herein typically include one or more suspending agents/anti-settling agents/viscosifiers/rheological agents, which help prevent the settling out of the PAM particles. Suitable suspending agents for use in accordance with the present disclosure include both high-gravity and low-gravity solids, the latter of which may include both active solids, such as clays, polymers, and combinations thereof, and inactive solids. In a non-limiting aspect of the disclosure, the suspending agent may be any appropriate clay, including, but not limited to, palygorskite-type clays such as sepiolite, attapulgite, and combinations thereof, smectite days such as hectorite, montmorillonite, kaolinite, saponite, bentonite, and combinations thereof, Fuller's earth, micas, such as muscovite and pholopogite, as well as synthetic clays, such as laponite. Various combinations of these suspending agents may be utilized. Preferably, in accordance with certain aspects of the present disclosure, the suspending agent is a clay selected from the group consisting of attapulgite, sepiolite, montmorillonite, kaolinite, bentonite, and combinations thereof. According to some embodiments, the suspending agent is present in the PAM premixed concentrate in an amount of about 0.1 to about 0.4 pounds of suspending agent per gallon of premixed concentrate. According to some embodiments, the premixed concentrate comprises about 1.5% to about 5% suspending agent. According to some embodiments, the suspending agent/rheological agent may be a polyurea-based rheology control agent. Examples of such polyurea-based agents include the BYK agents, such as BYK-8720, -8730, -7410, -7411, and -7420, available from BYK-Chemie GmbH, Wesel, Germany.

According to some embodiments, the PAM premixed concentrates may comprise one or more polar activators, which facilitate the hydration of the suspending agent in the concentrate. An example of a polar activator includes propylene carbonate. According to some embodiments, the PAM premixed concentrate may comprise about 0.01 to about 0.1 pounds of polar activator per gallon of premixed concentrate. According to some embodiments, the premixed concentrate comprises about 0.1% to about 1% polar activator.

According to some embodiments, the PAM premixed concentrates may comprise one or more surfactants. Non-limiting examples of suitable surfactants include cationic surfactants, anionic surfactants, zwitterionic surfactants, amphoteric surfactants, nonionic surfactants, viscoelastic surfactants and combinations thereof. According to some embodiments, the surfactant is an anionic surfactant. Alternatively, or additionally, any surfactant which aids the dispersion and/or stabilization of one or more components in the base fluid to form stabilized fluid can be used. Anionic surfactants suitable for use in forming the concentrates and compositions include the alkali metal, alkaline earth metal, ammonium, or amine salts of various organic acids that function to lower the surface tension of a fluid. Examples of anionic surfactants include fatty acid soaps, alkyl sulfonates, alpha olefin sulfonates, alkyl ether sulfates and sulfonates, linear alkyl benzene sulfonates, aromatic sulfonates such as cumene, xylene and toluene sulfonates, olefin sulfonates, alcohol sulfates and sulfonates, and mixtures thereof. For example, the surfactant may comprise dodecylbenzene sulfonate. An exemplary anionic surfactant suitable for use with the compositions of the present disclosure is CST-7605D, available from Conlen Surfactant Technology (Conroe, Tex.). According to some embodiments, the PAM premixed concentrate may comprise about 0.02 to about 0.1 pounds of surfactant per gallon of premixed concentrate. According to some embodiments, the premixed concentrate comprises about 0.1% to about 1.5% surfactant.

The disclosed PAM premixed concentrates may comprise additional additives. For example, the disclosed PAM premixed concentrates may comprise corrosion inhibitors, fluid loss control additives, bactericides, freeze point depressants, scale inhibitors and/or other additives known in the art.

The disclosed PAM premixed concentrates may be mixed with a base treating fluid, in a hydration unit, for example to provide an appropriate concentration of the PAM in the well treatment fluid. For example, about 0.1 to about 5 gallons of the premix concentrate may be blended into 1,000 gallons of well treating fluid. According to some embodiments, the concentration of PAM in the treating fluid may be about 0.1 to about 35 pounds of PAM per 1,000 gallons of the well treatment fluid. As mentioned above, the amount of concentrate added to the well treatment fluid may depend on the particular application. The amount of PAM in the well treatment fluid may depend on the particular application. For example, to provide drag reduction the amount of PAM in the well treatment fluid may be about 0.1 to about 8 pounds of PAM per 1,000 gallons of the well treatment fluid. If the purpose is to build viscosity in the treating fluid, then more PAM may be used, for example, about 8 to about 35 pounds of PAM per 1,000 gallons of the well treatment fluid. Other chemicals, such as biocides, scale inhibitors, etc., as well as proppant may then be blended with the well treatment fluid. The treatment fluid may then be pressurized and pumped into the wellbore via a wellhead to effect wellbore treatment.

As used herein, the term "about" typically refers to a margin of plus or minus 10% of the recited value. Although particular embodiments of the present invention have been shown and described, it should be understood that the above discussion is not intended to limit the present invention to these embodiments. It will be obvious to those skilled in the art that various changes and modifications may be made without departing from the spirit and scope of the present invention. Thus, the present invention is intended to cover alternatives, modifications, and equivalents that may fall within the spirit and scope of the present invention as defined by the claims.

What is claimed is:

1. A composition for preparing a fracturing fluid, the composition comprising:
    an organic fluid,
    a suspension agent, and
    a population of particles consisting of polyacrylamide (PAM) having a particle size distribution, wherein the specific surface area of the particle size distribution is about 35 $m^2$/kg or greater, wherein the composition is a concentrate composition, and wherein the PAM particles are within a molecular weight range of 10,000,000 to 30,000,000 Da.

2. The composition of claim 1, wherein the specific surface area of the particle size distribution is 100 $m^2$/kg or greater.

3. The composition of claim 1, wherein at least 3% of the particles have a particle size less than 11 µm.

4. The composition of claim 1, wherein at least 10% of the particles have a particle size less than 21 µm.

5. The composition of claim 1, wherein 40-65% of the particles are in a particle size range of 76-211 µm.

6. The composition of claim 1, wherein at least 10% of the particles have a particle size of greater than about 76 µm.

7. The composition of claim 1, wherein the particle size distribution, when plotted using a logarithmic particle size axis, is asymmetric and is negatively skewed.

8. The composition of claim 1, wherein the organic fluid is a low aromatic mineral oil.

9. The composition of claim 1, wherein the suspension agent is an organophilic clay.

10. The composition of claim 9, further comprising a polar activator.

11. The composition of claim 10, wherein the polar activator comprises propylene carbonate.

12. The composition of claim 1, further comprising one or more surfactants.

13. The composition of claim 1, comprising 2-6 pounds of the PAM particles per gallon of the concentrate composition.

14. A method of treating a wellbore, the method comprising:
    providing a concentrate composition comprising:
        an organic fluid,
        a suspension agent, and
        a population of particles consisting of polyacrylamide (PAM) having a particle size distribution, wherein the specific surface area of the particle size distribution is about 35 $m^2$/kg or greater, wherein the composition is a concentrate composition, and wherein the PAM particles are within a molecular weight range of 10,000,000 to 30,000,000 Da,
    preparing a well treatment fluid by mixing the concentrate composition with a base treating fluid, and
    pumping the well treatment fluid into the wellbore.

15. The method of claim 14, wherein the well treatment fluid comprises 0.1 to 5 gallons of concentrate composition per 1,000 gallons of well treatment fluid.

16. The method of claim 14, wherein the well treatment fluid comprises 0.1 to 35 pounds of PAM per 1,000 gallons of well treatment fluid.

17. The method of claim 14, wherein the well treatment fluid comprises 0.1 to 8 pounds of PAM per 1,000 gallons of well treatment fluid.

18. The method of claim 14, wherein the well treatment fluid comprises 8 to 35 pounds of PAM per 1,000 gallons of well treatment fluid.

19. The method of claim 14, further comprising blending a proppant with the well treatment fluid before pumping the well treatment fluid into the wellbore.

\* \* \* \* \*